United States Patent [19]

Ouillon et al.

[11] Patent Number: 4,856,507
[45] Date of Patent: Aug. 15, 1989

[54] TWO MAIN PILOTED VALVES DEMAND REGULATOR FOR AVIATORS

[75] Inventors: Rene Ouillon, Saulx Les Chartreux; Roger Langlois, Versailles, both of France

[73] Assignee: Intertechnique, Plaisir, France

[21] Appl. No.: 182,014

[22] Filed: Apr. 15, 1988

[30] Foreign Application Priority Data

Apr. 15, 1987 [FR] France ................ 87 05379

[51] Int. Cl.$^4$ ............................................. A61M 16/00
[52] U.S. Cl. ............................ 128/204.26; 128/204.29; 137/489; 137/908
[58] Field of Search ............. 128/204.18, 204.26, 128/204.28, 204.29, 205.24, 205.25; 137/102, 487, 488, 489, 491, 908, 505.12

[56] References Cited

U.S. PATENT DOCUMENTS

| | | | |
|---|---|---|---|
| 2,403,508 | 7/1946 | Deming | 128/204.29 |
| 2,596,178 | 5/1952 | Seeler | 128/204.29 |
| 2,685,288 | 8/1954 | Fields et al. | 128/204.29 |
| 3,077,881 | 2/1963 | Sprague | 128/204.29 |
| 3,768,466 | 10/1973 | Johnson | 128/204.26 |
| 4,127,129 | 11/1978 | Cramer | 128/204.26 |
| 4,240,219 | 12/1980 | Furlong et al. | 128/204.26 |
| 4,335,735 | 6/1982 | Cramer et al. | 128/204.26 |
| 4,616,646 | 10/1986 | Beaussant | 128/205.24 |

FOREIGN PATENT DOCUMENTS

| | | | |
|---|---|---|---|
| 661702 | 4/1963 | Canada | 128/204.29 |
| 84305 | 6/1962 | France | 128/204.26 |
| 849056 | 9/1960 | United Kingdom | 128/204.26 |
| 861720 | 2/1961 | United Kingdom | 128/204.29 |
| 865084 | 4/1961 | United Kingdom | 128/204.29 |
| 1430383 | 3/1976 | United Kingdom | 128/204.29 |

*Primary Examiner*—Eugene H. Eickholt
*Attorney, Agent, or Firm*—Larson and Taylor

[57] ABSTRACT

The regulator is suitable for use in a breathing apparatus, particularly for aircraft, whose oxygen source consists of an open loop generator delivering oxygen-rich air under a low and variable overpressure. It comprises a respiratory gas inlet and an outlet for connection to a breathing mask. Communication between the inlet and outlet is controlled by at least two main piloted valves located in parallel flow relation and subjected to the pressure prevailing in a same control chamber. The control chamber is continuously connected to the inlet by a restriction and it is connected to the outlet by a pilot valve controlled by the pressure at the outlet. The restriction is preferably variable responsive to the inlet pressure.

11 Claims, 2 Drawing Sheets

TWO MAIN PILOTED VALVES DEMAND REGULATOR FOR AVIATORS

BACKGROUND OF THE INVENTION

1. Technical Field

The invention relates to demand regulators for breathing installastions of the type having a breathing gas supply inlet and a connection outlet for connection to a breathing mask, which are placed in communication by means responsive to the pressure prevailing in a control chamber connected to a zone at a reference pressure by restriction means and to the connection outlet by a pilot valve controlled by the pressure prevailing at said connection outlet.

The invention is particularly suitable for use in breathing installations for aircraft crew members whose gas supply source is a generator of oxygen enriched air operating in open circuit and using selective adsorption of oxygen on a material such as a molecular sieve and subsequent oxygen release. Sources of this type are known and frequently designated by the abbrevation OBOG or OBOGS. As compared with liquid oxygen converters, they have the advantage of not requiring a ground supply of liquid oxygen.

On the other hand, while liquid oxygen converters and pressurized oxygen cylinders delivery oxygen at a high and relatively constant pressure (the range of pressure of variation typically being in the ratio of 1 to 2), open circuit generators supply breathing gas at a low and very variable pressure. The generators typically intake air delivered by the compressor of a jet engine and the pressure varies greatly depending on the flight configuration. A generator which may be considered as representative delivers breathing gas at a relative pressure (pressure above atmospheric) likely to vary from 200 mbars to 4 bars, namely in a ratio of 1 to 20. At the minimum pressure of 200 mbars, the regulator must be able to deliver a stabilized flow of about 100 1/min.

2. Prior Art

There exist regulators of the above-defined type, whose pressure responsive means have a diaphragm forming a main piloted valve. While of small size such valves are able to deliver the flow required when the source pressure is high and exhibits small variations only. Such is not the case when the supply pressure is low and very variable. The characteristics (external diameter, diameter of the circle of contact with the valve seat, thicknress, hardness) of the elastomer diaphragm forming the pressure responsive means are selected for supporting the maximum supply pressure without excessive deformation. A diaphragm valve thus dimensioned cannot deliver the required flow rate at a low pressure. If attempts are made to adapt the membrane valve to the lowest pressure, so that it is able to deliver the required flow, there is a risk of excessive deformation under high pressures and of parasitic vibrations detrimental to efficiency and reliability.

SUMMARY OF THE INVENTION

It is an object of the invention to provide a demand regulator having a pilot valve for miniaturization purpose, which is improved in operation when supplied under a low and vary variable pressure. For that, the pressure responsive means comprise at least two main piloted valves mounted in parallel flow relation and subjected to the pressure prevailing in a same control chambers.

Tests have shown that the increased number of piloted diaphragm valves makes it possible to use sufficiently flexible diaphragms for providing the required flow even at low pressures, however without any risk of permanent deformation of fatigue phenomena during operation under high pressures, which was at first sight contradictory.

In a preferred embodiment of the invention, the restriction means are arranged to offer a variable cross-sectional flow area to the gas flow between the zone at a reference pressure (generally the supply pressure, at least during certain operating phases) and the control chamber. For that, the restriction means may be formed by a primary nozzle and a secondary nozzle in parallel flow relation and the flow through the secondary nozzle is cut off, for example by a valve controlled by the supply pressure, when the supply pressure exceeds a predetermined value. With such an arrangement, over-pressurization of the control chamber (and correlative degradation of the performances of the regulator and of the breathing comfort of the wearer of the mask) is avoided at high supply pressures.

Some regulators, particularly those for military use, have an indicator light, called "blinker" which blinks at the rate of the pressure pulses of the breathing mixture flowing from the regulator to the mask. Often, the pressure variations are sensed in an injector for diluting the breathing gas delivered by the source (generally pure oxygen in prior art devices) with air taken from the atmosphere which surrounds the regulator. When the installation comprises an open circuit generator, dilution is often achieved in the generator so that there is no injector any longer. The normal pressure variations at the outlet may be too low to cause an indicator light to blink without fail. A regulator of the invention may advantageously comprise a detection circuit having a detection member (such as a diaphragm) responsive to the pressure differential across it. One of the faces is subjected to the pressure in the demand chamber defined by a diaphragm which actuates the pilot valve and the other face is subjected to the pressure in the breathing gas path at a point separated from the connection outlet by a calibrated check valve. With this arrangement, a depression is exerted on one of the faces and a slight overpressure on the other when the regulator is operating and the flow detection means may be actuated without fail.

The invention will be better understood from the following description of particular embodiments, given by way of examples.

DETAILED DESCRIPTION OF PREFERRED EMBODIMENTS

Figure 1:
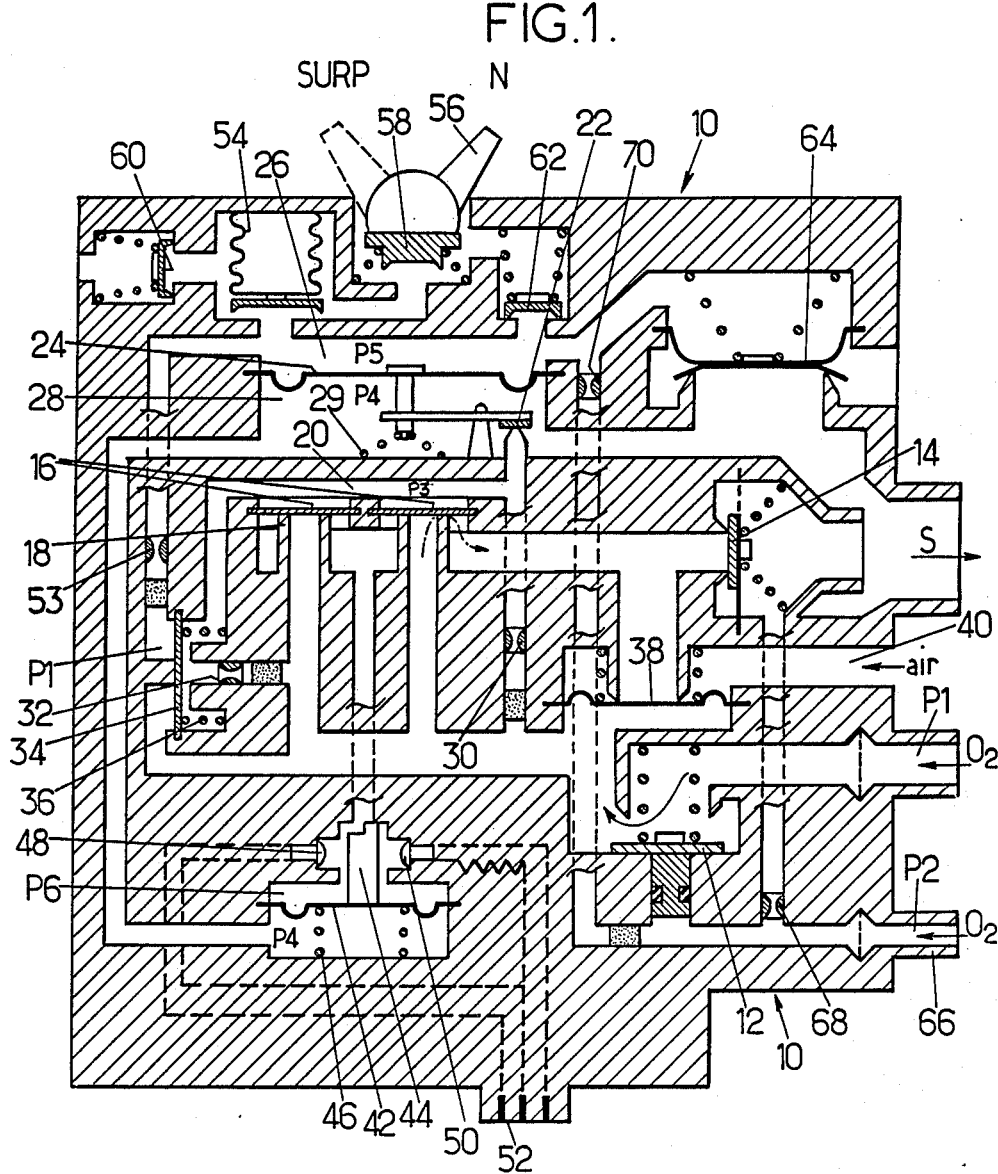
FIG. 1 is a general diagram showing the different circuits of a regulator of the invention.

Referring to FIG. 1, a regulator 10 may be mounted on an ejection seat which also carries an emergency pressurized oxygen cylinder; the various connections with the respiratory mask, the emergency supply and the regular supply may be conventional. The regulator is designed to be supplied, under normal operating conditions, by a generator of oxygen-enriched air operating in open circuit. Existing generators of this type are well known: they include an adsorption and release system delivering almost pure oxygen. They are often provided with a dilution system deivering breathing gas whose oxygen content is adjusted as a function of the altitude, under a pressure which varies within wide limits; often the relative pressure varies in a range of from 0.2 bar to 4 bars depending on the flight conditions.

The regulator shown in FIG. 1 is intended to operate up to high altitudes and consequently includes several circuits, some of which may be omitted for low altitude regulators not requiring an overpressure supply of the mask. The general construction of the regulator is conventional and those of the components which are not concerned by the invention will only be briefly described.

The regulator may be regarded as including a normal supply circuit, a flow detection circuit, an overpressure (pressurization) circuit and an emergency circuit located in a common housing and which will be described successively.

The normal supply circuit extends from a supply inlet delivering breathing gas at pressure P1 to an outlet S for connection to the hose of a breathing mask (not shown) provided with an exhalation valve. The circuit comprises, in succession: a pressure responsive automatically operating valve 12 for closing the circuit normally opened by a spring and the purpose of which will be described further on; pressure responsive means for communicating the inlet and outlet in response to the requirements of the user; and a calibrated check valve 14.

While in conventional regulators the pressure responsive means include a single main valve, the regulator of the invention shown in FIG. 1 has two main valves 16 mounted in parallel flow relation and each having a diaphragm whose resiliency biases it toward a seat 18 defining the breathing gas inlet. Generally, the two membranes will be identical.

In each valve 16, the diaphragm surface opposite that which bears on seat 18 is subjected to the pressure which prevails in a control chamber 20 connected:

continuously to the breathing gas supply inlet at pressure P1 by flow restriction means;

directly to the outlet S by a pilot valve 22 when the latter is open.

The pilot valve 22 is conventional; it is connected by a linkage to a demand diaphragm 24 subjected on one face to the pressure which prevails in a pressurization chamber 26 and which biases the valve toward opening and on the other face to the pressure P4 which prevails in the demand chamber 28 connected to the outlet. A spring 29 holds the pilot valve closed at rest.

In a conventional regulator, the restriction means placed between the gas inlet and the control chamber have a constant section. As shown in FIG. 1, the restriction means defines a gas leak cross-sectional flow area which varies responsive to the supply pressure P1. As shown in FIG. 1, the restriction means includes a main nozzle 30 continuously fed with breathing gas and a secondary nozzle 32 whose communication with the supply may be cut-off by a valve 34 subjected to the oppositely acting spring 36 which tends to open it and of the supply pressure P1 which tends to close it. When the supply pressure exceeds a predetermined value, for example 1 bar, valve 34 closes to avoid excess delivery of gas to the control chamber 20.

The pressure which prevails in the excess pressurizing control chamber 26 is equal to the ambient pressure during normal operation. It will be seen later that this pressure may be increased so that a pressurized breathing mixture be delivered at outlet S.

The normal supply circuit further includes an anti-suffocation valve 38 having a calibrated closure spring. This valve opens a direct connection for ambient air to flow through an air inlet 40 towards the outlet S if pressure P1 becomes zero.

Detection circuit

The flow detection circuit comprises a member responsive to the pressure differential across it; as shown in FIG. 1, it consists of a diaphragm 42 fixed to a plunger 44. A threshold adjustment spring 46, which may be adjustable, exerts on diaphragm 42 a force which tends to bring plunger 44 into the position shown in FIG. 1 and in which it interrupts the light path between an optical source 48 and a sensor 50; the source and sensor are connected to the amplifier of a display element via an electrical connector 52.

Diaphragm 42 separates two chambers, one of which is connected to the demand chamber 28 so as to be subjected to the depression P4 which prevails therein during inhalation (typically about -2 mbars). The chamber defined by the other face of membrane 42 is connected to the breathing gas path, at a point situated between the main piloted valves 16 and the calibrated check valve 14. The latter is calibrated for creating, upstream of outlet S, an inhalation overpressure P6 which is low (3 mbars for example) but sufficient (due to its cooperation with the depression acting on the other face) for moving diaphragm 42 during inhalation and bringing plunger 44 into a position in which it frees the light path to the sensor.

Pressurization circuit

The regulator shown in FIG. 1 supplies to the outlet S a pressurized breathing mixture, either upon manual command by the user or when the ambient pressure drops below a predetermined value.

For that purpose, the overpressure chamber 26 is not connected directly to the atmosphere. It is supplied with pressurized breathing gas via a calibrated nozzle 53. In the connection path with atmosphere are inserted, successively:

an overpressure valve on which an altimetric capsule 54 exerts a closing force which increases when the ambient pressure decreases; the capsule leaves the valve in open condition as long as the ambient pressure remains above the predetermined value, a "normal-overpressure" selector including a two position lever 56. In the "normal" position shown in FIG. 1, the lever opens a valve 58; then the possible overpressure is metered by the altimetric capsule 54. If however the lever is in the "overpressure" position (as shown with broken lines), the valve is completely closed and the pressure in chamber 26 is then determined either by a calibrated overpressure valve 60 (when the altimetric capsule is not effective) or by capsule 54.

The pressurizing circuit further has a safety valve 62 placed on the overpressure chamber 26 and a compensated safety valve 64 for connecting outlet S to the atmosphere.

Emergency circuit

The regulator shown in FIG. 1 has an inlet 66 for connection to an emergency supply source (pressurized oxygen cylinder for example). The pressure P2 applied to inlet 66, when the cylinder is open (typically about 9 bars) is much greater than pressure P1. The emergency circuit includes a first branch opening directly at outlet S for supplying the mask and having a calibrated jet 68 for limiting the oxygen flow. A second branch of the circuit, having an emergency overpressure nozzle 70, communicates with the overpressure chamber 26. When the cylinder is in service, pressure P2 acts on the pneumatic valve 12 and closes it for interrupting communication between the normal supply inlet and the breathing circuit.

The regulator operates as follows.

In normal operation without pressurization, the pressure P5 in the overpressure chamber 26 is equal to the ambient pressure, the overpressure selector being in the "normal" position and valve 58 being open.

The regulator is supplied at pressure P1. The breathing gas passes through the pneumatic valve 12, held open by its spring, and is distributed:

to the control chamber 20 by the primary nozzle 30 which is permanently open and, if pressure P1 is less than a given threshold, by the secondary nozzle 32 (valve 34 being open), to the main piloted valves 16, to the anti-suffocation valve 38 which is maintained closed by pressure P1.

Outside the periods of inhalation by the user of the mask, spring 29 closes the pilot valve 22. The pressure P3 in the control chamber 20 rises to value P1 and maintains the main valves 16 closed: there is no oxygen rich air delivery to the outlet S. When the user breathes in, he generates a depression P4 in the demand chamber 28. The demand diaphragm 24 moves and opens valve 22. The latter partially empties the control chamber 20. Decrease of the pressure in the control chamber 20 causes the main valves 16 to open and breathing gas passes towards the mask.

During inhalation an overpressure P6 appears upstream of the calibrated valve 14 and is transmitted to the diaphragm 42 of the flow detector. The depression P4 in the demand chamber 28 is also transmitted to diaphragm 42 which drives a plunger 44 clear of the light path to the detector. A signal is sent via connector 52 to an amplifier (not shown) supplying the blinker.

As soon as the user ceases to inhale the depression in the demand chamber 28 disappears. The pilot valve 22 closes. Pressure increases in the control chamber 20 to a value close to the supply pressure P1. The diaphragms of the main valves 16 are applied against their seats and stop the flow to the outlet S. Pressure P6 reverts to its initial value and plunger 44 moves back. The flow detector ceases to deliver a signal. Operation of the regulator is thus revealed by the blinking of the indicator light or "blinker".

Depending on whether the supply pressure is less or greater than 1 bar over atmosphere, valve 34 is opened or closed; in the second case, it avoids overfeeding of the control chamber with excess gas. such overfeeding would reduce the rate at which the control chamber can be emptied and would degrade the response of the regulator to alternate cycles.

When lever 56 is in the "overpressure" position, valve 58 is closed. The calibrated gas flow delivered by restriction 53 can only escape to the ambient atmosphere via the overpressure valve. The pressure P5 in the overpressure chamber 26 and the pressure acting on the compensated safety valve 64 increase. The pressure consequently increases in the whole of the breathing circuit to a value adjustable by calibration of valve 60. An amount of pressurization of about 5 mbars will often be selected.

Automatic delivery of pressurized oxygen-rich gas is also caused above a predetermined altitude by a circuit supplied by the same restriction 53 as that which serves for manual pressurization. Assuming that lever 56 is in the "normal" position, the pressure P5 acting on the demand diaphragm increases when the altimetric capsule 54 tends to close the venting passage until it reaches a value for which its action exceeds the force exerted by the altimetric capsule. There is again a pressure increase in the whole breathing circuit, up to a value depending on the ambient pressure.

When the emergency oxygen source is rendered operative, the oxygen pressure P2 at inlet 66 closes valve 12 and separates the regular generator from the regulator. Valve 38 opens under the action of its spring since it is no longer held closed by pressure P1. Oxygen at pressure P2 is distributed to the emergency restriction or "jet" 68 and to the emergency overpressure nozzle 70. The user inhales oxygen delivered via restriction 68. His breathing needs are completed by ambient air drawn through valves 38 and 14.

The altimetric capsule 54 establishes an overpressure P5 above the demand diaphragm as a function of the ambient pressure above a predetermined altitude.

During exhalation, the exhalation valve of the mask (not shown) is not blocked by the continuous flow since the pressure compensated valve 64 allows a continuous discharge flow to atmosphere while maintaining in the circuit a pressure depending on the altitude.

Figure 2:
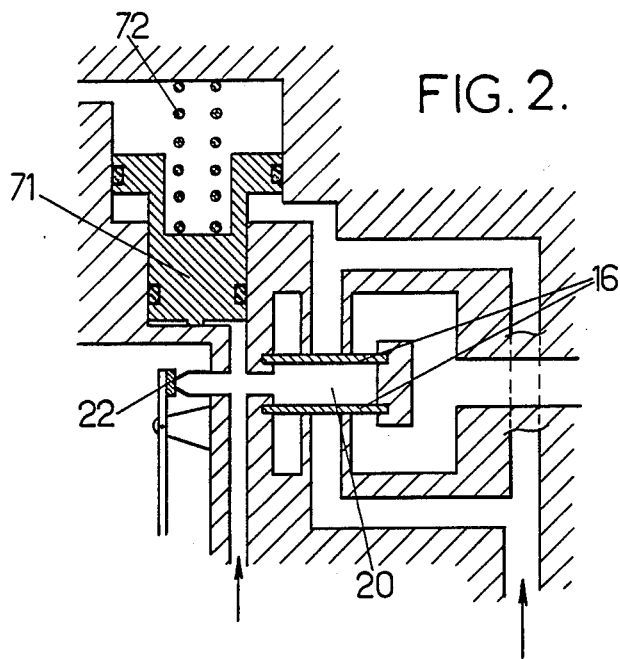
FIG. 2 is a diagram showing another possible arrangement of the main valves of a regulator having a general construction similar to that of FIG. 1 and a control chamber whose volume changes automatically responsive to the supply pressure.

Numerous modified embodiments are possible. As shown in FIG. 2, in which the elements corresponding to those already described bear the same reference numbers, the diaphragm valves 16 are placed coaxially in tandem relation on both sides of the control chamber 20 instead of being mounted in parallel relation as in FIG. 1. This solution reduces the volume of the pilot circuit and reduces the response time at low supply pressures.

Referring to FIG. 2 again, the control chamber has a volume which is automatically variable responsive to the supply pressure. As shown in FIG. 2, the result is attained by constituting part of the control chamber as a cylinder slidably receiving a piston 71 subjected to the opposed actions of a progressivity spring 72 and of the pressure in the control chamber. Thus the main valves 16 may open more progressively at high supply pressures, since the pressure drop in the control chamber is slowed down when the pilot valve 22 opens. In practice, the volume of the chamber will often be caused to vary by about 30% when the supply pressure varies between the minimum pressure and the maximum pressure supplied by an OBOGS generator.

Figure 3:
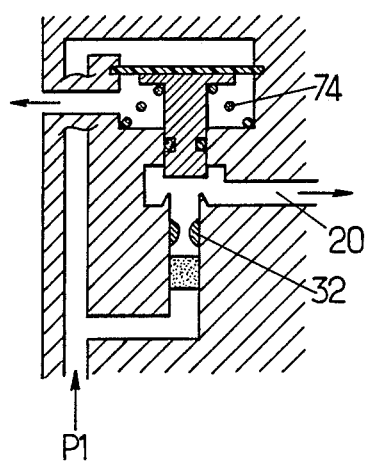
FIG. 3 is a detail view showing a modification of the pneumatic valve of FIG. 1.

In the embodiment of FIG. 3, the variation of the flow area offered to the gas coming from the supply towards the control chamber is achieved by a valve different from that of FIG. 1; the valve has a passage downstream of the secondary nozzle 32, which is throttled by a plunger subjected to the oppositely acting forces of a spring 74 and of pressure P1; the plunger restricts the leak cross-section downstream of the secondary nozzle 32 when the supply pressure increases.

Figure 4:
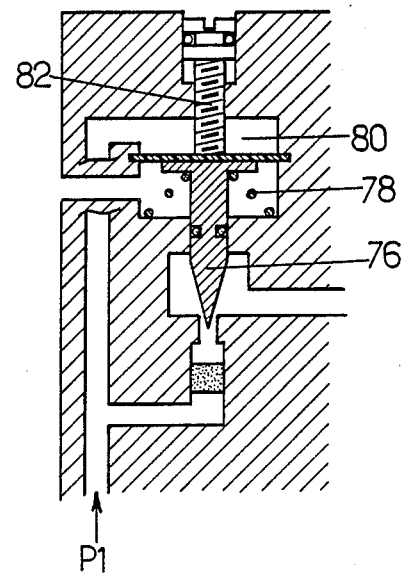
FIG. 4 is a diagram showing a possible construction of the restriction means, which may be used to replace that shown in FIG. 1.

In the embodiment of FIG. 43, the variation is progressive, whereas it is stepwise as shown in FIG. 1. Progressivity is obtained by substituting the closable nozzle 32 of FIG. 1 with a needle 76 subjected to the opposed action of a return spring 78 which biases the needle toward the abutment position in which it is shown in FIG. 4 and in which it clears a maximum cross-sectional flow area and the pressure P1 which prevails in chamber 80 and which biases the needle toward abutment against the edge of the gas flow duct. The maximum value of the flow area may be adjusted with a screw 82 and the pressure variation law is determined by the characteristics of the return spring 78.

We claim:

1. Demand regulator for breathing apparatus, having in a housing:
    a breathing gas supply inlet for connection with a generator of breathing gas under variable pressure,
    an outlet for connection to a breathing mask,
    pressure responsive valve means comprising at least two main piloted valves controlling communication between said inlet and said outlet responsive to pressure in a same control chamber,
    rstriction means continuously communicating said control chamber to a zone at a reference pressure, and
    a pilot valve controlled by the pressure prevailing in a demand chamber continuously connected to said outlet and controlling communication between the control chamber and the outlet.

2. Demand regulator according to claim 1, wherein said restriction means are constructed and arranged to offer a variable cross-sectional flow area to a gas flow between said zone at reference pressure and the control chamber.

3. Demand regulator according to claim 2, wherein said restriction means comprise a primary nozzle and a secondary nozzle located in parallel gas flow relation, and wherein valve means controlled by the pressure at said inlet are provided for cutting-off flow through said secondary nozzle when said pressure at said inlet exceeds a predetermined value.

4. Demand regulator according to claim 2, wherein said restriction means comprise a passage of fixed cross-sectional area and a needle subjected to the opposed action of a return spring biasing said needle toward a position where it clears said passage and the pressure at the inlet which biases it toward closure of the passage.

5. Demand regulator according to claim 1, wherein said main piloted valves are located side by side.

6. Demand regulator according to claim 1, wherein said two main piloted valves are located coaxially in a tandem arrangement and separated by the control chamber.

7. Demand regulator according to claim 1, further comprising diaphragm means having two major surfaces, one of which is subjected to the pressure from said demand chamber and the other of which is connected to the outlet via a calibrated check valve and wherein said diaphragm is secured to a member whose alternate movement controls display means for displaying pressure variations at said outlet.

8. Demand regulator according to claim 1, further comprising means for increasing the volume of the control chamber responsive to increase of the pressure at the breathing gas supply inlet.

9. Demand regulator according to claim 8, wherein said means for increasing the volume of the control chamber comprise a cylinder communicating with said control chamber and slidably receiving a piston subjected to the opposed actions of a return spring and of the pressure at said breathing gas supply inlet.

10. In a breathing system having a generator of oxygen-rich air under a variable pressure over ambient operating in open circuit and using selective adsorption of oxygen and subsequent release of oxygen and having at least one breathing mask for use by an aircraft crew member, a demand regulator having, in a housing:
    a breathing gas supply inlet for connection with said generator,
    an outlet for connection to said breathing mask,
    pressure responsive valve means comprising at least two main piloted valves controlling communication between said inlet and said outlet responsive to pressure in a same control chamber,
    restriction means continuously communicating said control chamber to a zone at a reference pressure, said restriction means being constructed and arranged to offer a variable cross-sectional flow area to a gas flow between said zone at a reference pressure and the control chamber, and
    a pilot valve controlled by the pressure prevailing in a demand chamber continuously connected to said outlet for controlling communication between the control chamber and the outlet.

11. A breathing system according to claim 10, further comprising means for modifying the volume of the control chamber by a maximum amount of about 30% responsive to the pressure at said supply inlet.

* * * * *